July 20, 1965

C. W. POOLE 3,195,918

VEHICLE SUSPENSION CONSTRUCTION HAVING RESILIENT SPRING SEAT

Filed Dec. 30, 1963

INVENTOR.
CHARLES W. POOLE
BY John R. Faulkner
Clifford L. Sadler
ATTORNEYS

July 20, 1965  C. W. POOLE  3,195,918
VEHICLE SUSPENSION CONSTRUCTION HAVING
RESILIENT SPRING SEAT
Filed Dec. 30, 1963  2 Sheets-Sheet 2

CHARLES W. POOLE
INVENTOR.

BY John R. Faulkner
Clifford L. Sadler

ATTORNEYS

United States Patent Office 3,195,918
Patented July 20, 1965

3,195,918
VEHICLE SUSPENSION CONSTRUCTION HAVING RESILIENT SPRING SEAT
Charles W. Poole, Royal Oak, Mich., assignor to Ford Motor Company, Dearborn, Mich., a corporation of Delaware
Filed Dec. 30, 1963, Ser. No. 334,303
7 Claims. (Cl. 280—124)

The present invention relates generally to vehicle suspension systems and has particular application to independent front suspensions.

In an automotive vehicle, it is conventional practice to position a front wheel and its support member by upper and lower laterally extending suspension arms. The arms are interposed between the vehicle chassis and the wheel support. Most front suspensions of this type are referred to as SLA suspensions which stands for short and long arms. The upper arm is a short arm and the lower arm is the long arm.

A coil spring is usually provided to support the chassis upon the suspension. Where the vehicle is of unit body or integral frame construction, the suspension spring is often a coil spring interposed between the upper suspension arm and body sheet metal.

In an arrangement of this type, the short upper suspension arm undergoes considerable angular displacement when the wheel moves from extreme jounce to extreme rebound. Because the coil spring is basically a linear device, means must be provided to make it compatible with the extreme angular movement of the upper arm. The means must support the suspension spring so that it will not buckle.

The present invention provides an improved construction for supporting a spring seat upon a suspension arm. In addition, the present invention provides a support for the end of a telescopic shock absorber that eliminates interaction between the spring seat and the shock absorber mount.

In the preferred embodiment of this invention, a rubber block is mounted on the suspension arm to support the lower spring seat. With this construction, when the arm traverses its jounce and rebound path the spring seat is substantially free to maintain a parallel relationship with the upper spring seat. The lower end of the shock absorber is pivotally connected to a pin that is embedded in the rubber. This isolates the shock absorber from the spring seat and the suspension arm.

The many objects and advantages of this invention will be understood by consideration of the following discussion and the accompanying drawings, in which.

Figure 1:
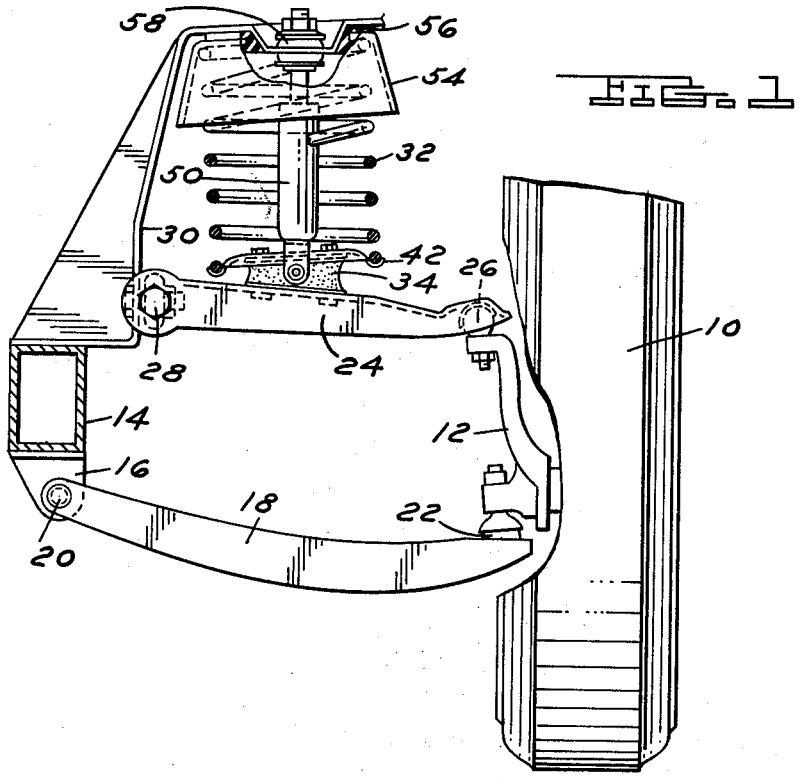
FIGURE 1 is an elevational view of an independent suspension system for an automotive vehicle incorporating the present invention.
Figure 2:
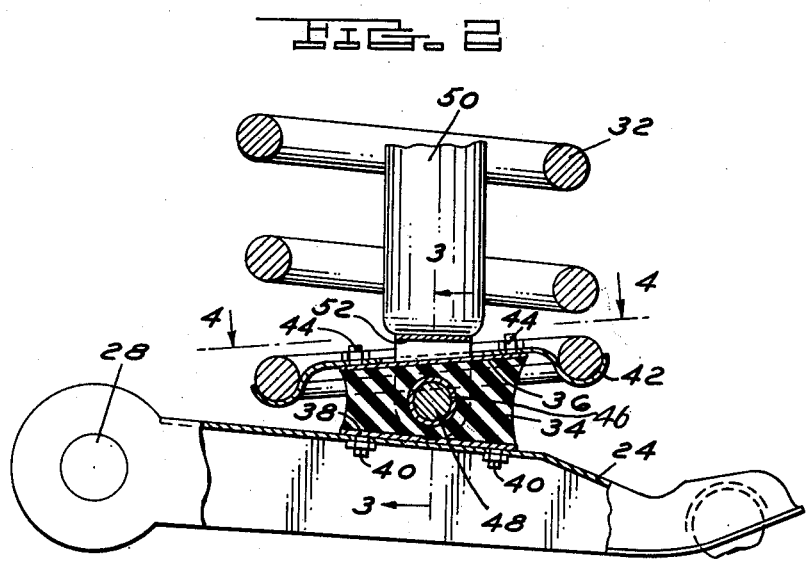
FIGURE 2 is an elevational view partly in section of a portion of the structure disclosed in FIGURE 1.
Figure 3:
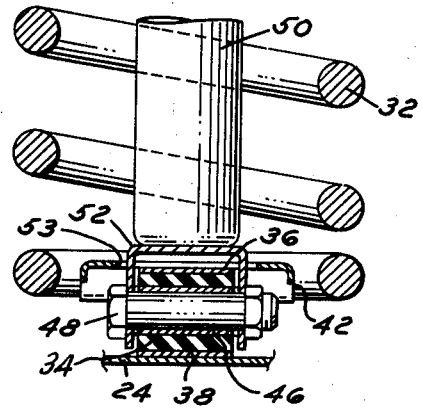
FIGURE 3 is a sectional view taken along section lines 3—3 of FIGURE 2.

Referring now to the drawings, FIGURE 1 discloses an independent suspension system for an automobile. The suspension includes a wheel 10 that is rotatably supported on a wheel support member 12. A vehicle chassis is provided and includes a frame member 14 having a depending bracket 16. A lower suspension arm 18 interconnects the bracket 16 and the wheel support member 12. Arm 18 is provided with a pivotal support 20 at its inner end and a ball joint connection 22 at its outer end for relative vertical movement between the interconnected members.

An upper suspension arm 24 has a ball joint 26 that connects its outer end with the wheel support member 12. Pivotal connection 28 joins the inner end of the upper arm 24 with the chassis sheet metal 30.

With this arrangement, the wheel and its support member 12 may traverse a vertical jounce and rebound path relative to the frame member 14 and its associated members 16 and 30 due to the articulated connections of the upper and lower suspension arms 18 and 24.

Means are provided to resiliently support the vehicle's chassis upon its suspension. Such means include a coil spring 32 having a lower end connected to the upper arm 24.

Figure 4:
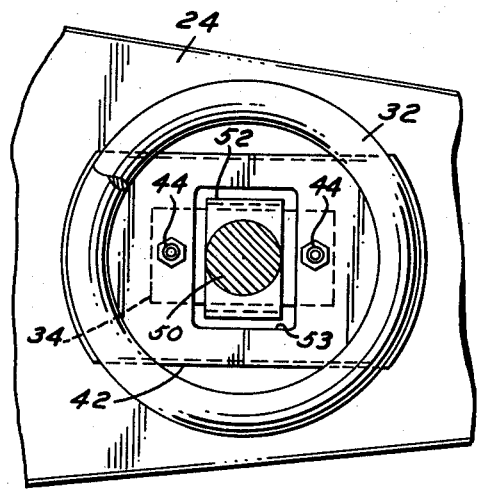
FIGURE 4 is a sectional view taken along section lines 4—4 of FIGURE 2.

A rubber block 34 has an upper plate 36 and a lower plate 38 bonded thereto. As noted in FIGURE 4, the block 34 has a generally rectangular shape in the plan view. The lower plate 38 is secured by bolts 40 to the upper arm 24. A spring seat 42 is joined by bolts 44 to the upper plate 36. The spring seat 42 is provided with a marginal groove to receive the lower coil of the suspension spring 32.

A sleeve 46 is embedded in the rubber mount and receives a pivot bolt 48. A telescopic shock absorber 50 is connected to the pivot bolt 48 by a channel-shaped member 52 that is welded to its lower end. The bolt 48 engages the depending side flanges of the channel member 52 and passes through the sleeve 46. The spring seat 42 has a central opening 53 to permit the side flanges to reach the pivot bolt 48.

A cup-shaped upper spring seat 54 receives the upper end of the coil spring 52. It is connected to the chassis sheet metal member 30 by means of an annular rubber mount 56. The upper end of the shock absorber 50 is provided with a bayonet type mount 58 that engages the chassis sheet metal 30 in a conventional fashion.

When the suspension arm 24 oscillates about its pivot 28, the rubber block 34 will deform to permit the spring seat 42 to remain generally parallel to the upper spring seat 54. This will prevent the coil spring 32 from buckling during jounce and rebound movement of the suspension arm 24.

The rubber block also serves to isolate the lower end of the shock absorber 50 from the suspension arm and to prevent interaction with the coil spring 32. Free pivotal movement between the lower end of the shock absorber 50 is permitted and, in addition, the rubber block 34 prevents the transmission of shock absorber and other suspension noises.

Modifications and alterations of this invention may occur to those skilled in the art that will come within the scope and spirit of the following claims:

What is claimed as new is:

1. An independent vehicle suspension system including a vehicle chassis, a wheel, a support member for said wheel, a lower suspension arm pivotally interconnecting said chassis and said support member, an upper suspension arm pivotally interconnecting said chassis and said support member, said upper arm being shorter than said lower arm, a coil spring interposed between said chassis and said upper arm, a spring seat receiving the lower end of said coil spring, a rubber block mounted on said upper arm and supporting said spring seat, a shock absorber having one end secured to said chassis and its other end pivotally connected to said rubber block, said shock absorber being located within said coil spring.

2. An independent vehicle suspension system including a vehicle chassis, a wheel, a support member for said wheel, a lower suspension arm pivotally interconnecting said chassis and said support member, an upper suspension arm pivotally interconnecting said chassis and said support member, a coil spring interposed between said chassis and said upper arm, a spring seat receiving the lower end of said coil spring, a rubber block mounted on said upper arm and supporting said spring seat, a shock absorber having one end secured to said chassis and its other end pivotally connected to said rubber block, said shock absorber being located within said coil spring.

3. An independent vehicle suspension system including a vehicle chassis, a wheel, a support member for said wheel, a first suspension arm pivotally interconnecting said chassis and said support member, a second suspension arm pivotally interconnecting said chassis and said support member, said first arm being shorter than said second arm, a coil spring interposed between said chassis and said first arm, a spring seat receiving the lower end of said coil spring, a rubber block mounted on said first arm and supporting said spring seat, a shock absorber having one end secured to said chassis, a transfer pivot pin pivotally connecting the other end of said shock absorber to said rubber block, said shock absorber being located within said coil spring.

4. An independent vehicle suspension system including a vehicle chassis, a wheel, a support member for said wheel, first and second suspension arms pivotally interconnecting said chassis and said support member, a coil spring interposed between said chassis and said first arms, a spring seat receiving the lower end of said coil spring, a rubber block mounted on said first arm and supporting said spring seat, a shock absorber having one end secured to said chassis, a transfer pivot pin pivotally connecting the other end of said shock absorber to said rubber block, said shock absorber being located within said coil spring.

5. A vehicle suspension system including a chassis, a wheel support member and a suspension arm pivotally connected to said chassis and to said wheel support member, a rubber block mounted on said arm, a spring seat mounted on said rubber block, a coil spring interposed between said chassis and said spring seat, a shock absorber positioned generally concentrically within said coil spring and having one end connected to said chassis and its other end pivotally connected to said rubber block.

6. A vehicle suspension system including a chassis, a wheel support member and a suspension arm pivotally connected to said chassis and to said wheel support member, a rubber block mounted on said arm, a spring seat mounted on said rubber block, a coil spring interposed between said chassis and said spring seat, a shock absorber having one end connected to said chassis and its other end pivotally connected to said rubber block.

7. An independent vehicle suspension system including a vehicle chassis, a wheel, a support member for said wheel, a lower suspension arm pivotally interconnecting said chassis and said support member, an upper suspension arm pivotally interconnecting said chassis in said support member, said upper arm being shorter than said lower arm, a coil spring having its upper end connected to said chassis, a generally rectangular spring seat having a groove at each of its ends receiving the lower end of said coil spring, a rubber block having a rectangular cross section in the plan view mounted on said upper arm and supporting said spring seat, a shock absorber having one end secured to said chassis and its other end provided with a pair of depending side flanges that straddle said block, a pivot tube imbedded in said block, a pivot bolt passing through said tube and interconnecting said side flanges, said shock absorber being located within said coil spring.

References Cited by the Examiner

UNITED STATES PATENTS

| | | | |
|---|---|---|---|
| 2,621,919 | 12/52 | Utz | 267—20 |
| 2,916,282 | 12/59 | Muller | 267—20 |
| 3,115,349 | 12/63 | Lerg | 267—20 |

FOREIGN PATENTS 1,189,165  3/59  France.

A. HARRY LEVY, *Primary Examiner.*